(12) United States Patent
Ohmiya

(10) Patent No.: US 8,705,143 B2
(45) Date of Patent: Apr. 22, 2014

(54) IMAGE-FORMING DEVICE

(75) Inventor: Takashi Ohmiya, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 651 days.

(21) Appl. No.: 12/579,764

(22) Filed: Oct. 15, 2009

(65) Prior Publication Data

US 2010/0128325 A1 May 27, 2010

(30) Foreign Application Priority Data

Nov. 26, 2008  (JP) ................................. 2008-300537

(51) Int. Cl.
*H04N 1/40* (2006.01)
*G06K 15/00* (2006.01)
*G06K 19/00* (2006.01)
*G06K 19/07* (2006.01)

(52) U.S. Cl.
CPC ............ *G06K 19/00* (2013.01); *G06K 19/0723* (2013.01); *H04N 2201/00* (2013.01); *H04N 2201/32* (2013.01); *H04N 2201/3216* (2013.01); *H04N 2201/3219* (2013.01); *H04N 2201/3201* (2013.01)
USPC ......... 358/3.28; 358/1.1; 358/1.12; 358/1.14; 358/1.15; 358/1.16; 358/1.18

(58) Field of Classification Search
CPC .......... G06K 17/0022; G06K 17/0025; G06K 17/0029; G06K 19/067; G06K 19/07; G06K 19/0701; G06K 19/0716; G06K 19/0719; G06K 19/072; G06K 19/0722; G06K 19/0723; G06K 19/0724; G06K 19/0725; G06K 19/0726; G06K 19/0727; H04N 1/00326; H04N 1/00328; H04N 1/00339; H04N 1/00342; H04N 2201/3212; H04N 2201/3214; H04N 2201/3215; H04N 2201/3216; H04N 2201/3218; H04N 2201/3219; H04N 2201/3221; H04N 2201/3222; H04N 2201/3223
USPC .......................... 358/1.1, 1.9, 1.15, 1.16, 3.28
See application file for complete search history.

(56) References Cited

U.S. PATENT DOCUMENTS 7,273,165 B2 * 9/2007 Satake et al. .................. 235/375
7,847,958 B2   12/2010 Ishikura
(Continued)

FOREIGN PATENT DOCUMENTS

JP   2002-337426      11/2002
JP   2004-142420 A     5/2004
(Continued)

OTHER PUBLICATIONS

Extended European Search Report dated Feb. 22, 2010.
(Continued)

*Primary Examiner* — Richard Zhu
(74) *Attorney, Agent, or Firm* — Scully, Scott, Murphy & Presser

(57) ABSTRACT

In an image-forming device, an image-reading unit reads an image formed on an original document. A data-reading unit reads data stored in a storing member of the original document. A duplication-performing unit performs a plurality of duplication processes including at least an image/data-duplication process in which the duplication-performing unit forms the read image on a first recording medium having a storing member and writes the read data to the storing member of the first recording medium, and a data-duplication process in which the duplication-performing unit writes the read data to the storing member of the first recording medium without forming the read image on the first recording medium. A receiving unit receives an image/data-duplication instruction and a data-duplication instruction. The duplication-performing unit performs the image/data-duplication process if the receiving unit receives the image/data-duplication instruction, and performs the data-duplication process if the receiving unit receives the data-duplication instruction.

9 Claims, 9 Drawing Sheets

(56) References Cited

U.S. PATENT DOCUMENTS

| | | | |
|---|---|---|---|
| 7,889,360 B2 | 2/2011 | Kiwada | |
| 8,154,769 B2 * | 4/2012 | McFarland et al. | 358/400 |
| 8,164,771 B2 * | 4/2012 | Hikichi et al. | 358/1.15 |
| 8,189,214 B2 * | 5/2012 | Ishii | 358/1.14 |
| 8,243,301 B2 * | 8/2012 | Ogura et al. | 358/1.14 |
| 2002/0170973 A1 | 11/2002 | Teraura | |
| 2004/0046999 A1 | 3/2004 | Watanabe et al. | |
| 2004/0194133 A1 | 9/2004 | Ikeda et al. | |
| 2005/0029353 A1 | 2/2005 | Isemura et al. | |
| 2005/0105920 A1 * | 5/2005 | Matsunaga | 399/1 |
| 2005/0111867 A1 * | 5/2005 | Hatano | 399/80 |
| 2005/0133707 A1 * | 6/2005 | Ichiyanagi | 250/234 |
| 2006/0028667 A1 | 2/2006 | Saito | |
| 2006/0082818 A1 * | 4/2006 | Kasamatsu et al. | 358/1.15 |
| 2006/0098901 A1 | 5/2006 | Hino | |
| 2006/0215228 A1 | 9/2006 | Inaba | |
| 2006/0275064 A1 * | 12/2006 | Minari | 399/366 |
| 2007/0157826 A1 | 7/2007 | Mestres et al. | |
| 2007/0194098 A1 | 8/2007 | Nakata et al. | |
| 2007/0216939 A1 | 9/2007 | Wada et al. | |
| 2007/0274753 A1 | 11/2007 | Muto | |
| 2008/0037034 A1 * | 2/2008 | Ishii | 358/1.1 |
| 2008/0074695 A1 | 3/2008 | Ikeno et al. | |
| 2008/0082914 A1 | 4/2008 | Ueno et al. | |
| 2008/0266602 A1 * | 10/2008 | Moriyama et al. | 358/1.15 |
| 2009/0251721 A1 * | 10/2009 | Knodt et al. | 358/1.15 |

FOREIGN PATENT DOCUMENTS

| | | |
|---|---|---|
| JP | 2005-028673 A | 2/2005 |
| JP | 2005-53077 | 3/2005 |
| JP | 2005-117571 | 4/2005 |
| JP | 2005-197831 | 7/2005 |
| JP | 2005-204177 | 7/2005 |
| JP | 2005-238532 | 9/2005 |
| JP | 2005-265902 | 9/2005 |
| JP | 2006-5544 | 1/2006 |
| JP | 2006-103284 | 4/2006 |
| JP | 2006-110802 | 4/2006 |
| JP | 2006-135444 A | 5/2006 |
| JP | 2006-143436 | 6/2006 |
| JP | 2006-229717 A | 8/2006 |
| JP | 2006-317526 | 11/2006 |
| JP | 2006-352330 | 12/2006 |
| JP | 2007-006316 | 1/2007 |
| JP | 2007-060220 A | 3/2007 |
| JP | 2007-88720 | 4/2007 |
| JP | 2007-225724 | 9/2007 |
| JP | 2008-76851 | 4/2008 |
| JP | 2008-090340 A | 4/2008 |
| JP | 2009-295106 | 12/2009 |

OTHER PUBLICATIONS

Japanese Official Action dated Sep. 9, 2010 together with an English language translation.

Chinese Office Action dated Feb. 7, 2012 from related Chinese Application No. 200910224962.4, together with an English language translation.

Japanese Official Action dated Apr. 5, 2011 together with an English language translation from JP 2008-300537.

Japanese Office Action issued on Nov. 16, 2010 in related case JP 2008-328617.

Extended European Search Report issued Jan. 25, 2011 in related case EP 09252872.8.

Chinese Office Action issued on Feb. 13, 2012 in related case CN 200910262220.0.

U.S. Office Action dated Mar. 1, 2012 received in a related U.S. Appl. No. 12/644,767.

U.S. Office Action dated Sep. 14, 2012 received in a related U.S. Appl. No. 12/644,767.

European Office Action dated Dec. 7, 2010 received in related case EP 09252439.6.

Office Action received in a related U.S. Appl. No. 12/644,767 Final office action mailed on Oct. 11, 2013.

Office Action received in a related U.S. Appl. No. 12/644,767 Non-final rejection mailed on May 23, 2013.

European Office Action dated Dec. 6, 2013 received in corresponding European Patent application No. 9252439.6.

Notice of Allowance dated Jan. 27, 2014 received in a related U.S. Appl. No. 12/644,767.

* cited by examiner

| NUMBER OF IMAGE/RFID DUPLICATE | 1 |
| --- | --- |
| NUMBER OF DATA DUPLICATE | 3 |
| NUMBER OF IMAGE DUPLICATE | 6 |
| TOTAL NUMBER OF DUPLICATE | 10 |

| NUMBER OF IMAGE/RFID DUPLICATE | 0 |
| NUMBER OF DATA DUPLICATE | 0 |
| NUMBER OF IMAGE DUPLICATE | 10 |
| TOTAL NUMBER OF DUPLICATE | 10 |

|  | NUMBER OF SUCCESS | NUMBER OF FAILURE |
|---|---|---|
| IMAGE/RFID DUPLICATE | 10 | 1 |
| DATA DUPLICATE | 15 | 2 |
| IMAGE DUPLICATE | 8 | 0 |

OK

IMAGE-FORMING DEVICE

CROSS REFERENCE TO RELATED APPLICATION

This application claims priority from Japanese Patent Application No. 2008-300537 filed on Nov. 26, 2008. The entire content of this application is incorporated herein by reference.

TECHNICAL FIELD

The present invention relates to an image-forming device, and particularly to an image-forming device with a function for creating duplicates of an original document having a storage unit, such as an RFID tag.

BACKGROUND

Recently image-forming devices have been developed with functions for printing images on a sheet of paper having an IC chip called a radio frequency identification (RFID) tag and for writing data to the RFID tag. There have also been proposals for image-forming devices that scan an image from an original document having an RFID tag, reading data stored in the RFID tag, printing the scanned image on a sheet of recording paper having an RFID tag, and writing the data read from the RFID tag of the original to the RFID tag of the recording paper to create a duplicate of the original document's image data and RFID data (hereinafter referred to as a "image/RFID duplicate).

SUMMARY

However, it is desirable to improve the user-friendliness of such image-forming devices, since the devices do not consider options for creating duplicates in formats other than the image/RFID duplicate format.

In view of the foregoing, it is an object of the present invention to provide an image-forming device capable of improving user-friendliness for creating duplicates of original documents having storage units.

In order to attain the above and other objects, the invention provides an image-forming device including an image-reading unit, a data-reading unit, a duplication-performing unit, a receiving unit, and a controlling unit. The image-reading unit reads an image formed on an original document. If the original document has a storing member, the data-reading unit reads data stored in the storing member. The duplication-performing unit performs a plurality of duplication processes including at least an image/data-duplication process in which the duplication-performing unit forms the read image on a first recording medium having a storing member and writes the read data to the storing member of the first recording medium, and a data-duplication process in which the duplication-performing unit writes the read data to the storing member of the first recording medium without forming the read image on the first recording medium. The receiving unit receives an image/data-duplication instruction and a data-duplication instruction. The controlling unit controls the duplication-performing unit to perform the image/data-duplication process if the receiving unit receives the image/data-duplication instruction, and controls the duplication-performing unit to perform the data-duplication process if the receiving unit receives the data-duplication instruction.

BRIEF DESCRIPTION OF THE DRAWINGS

The particular features and advantages of the invention as well as other objects will become apparent from the following description taken in connection with the accompanying drawings, in which:

FIG. 7 shows a configuration screen when a RFID tag is attached to an original document;

FIG. 8 shows a configuration screens when the RFID tag is not attached to the original document; and FIG. 9 shows an error display screen.

DETAILED DESCRIPTION

Next, a preferred embodiment of the present invention will be described with reference to FIGS. 1 through 8.

<Overall Structure of a Printer>

Figure 1:
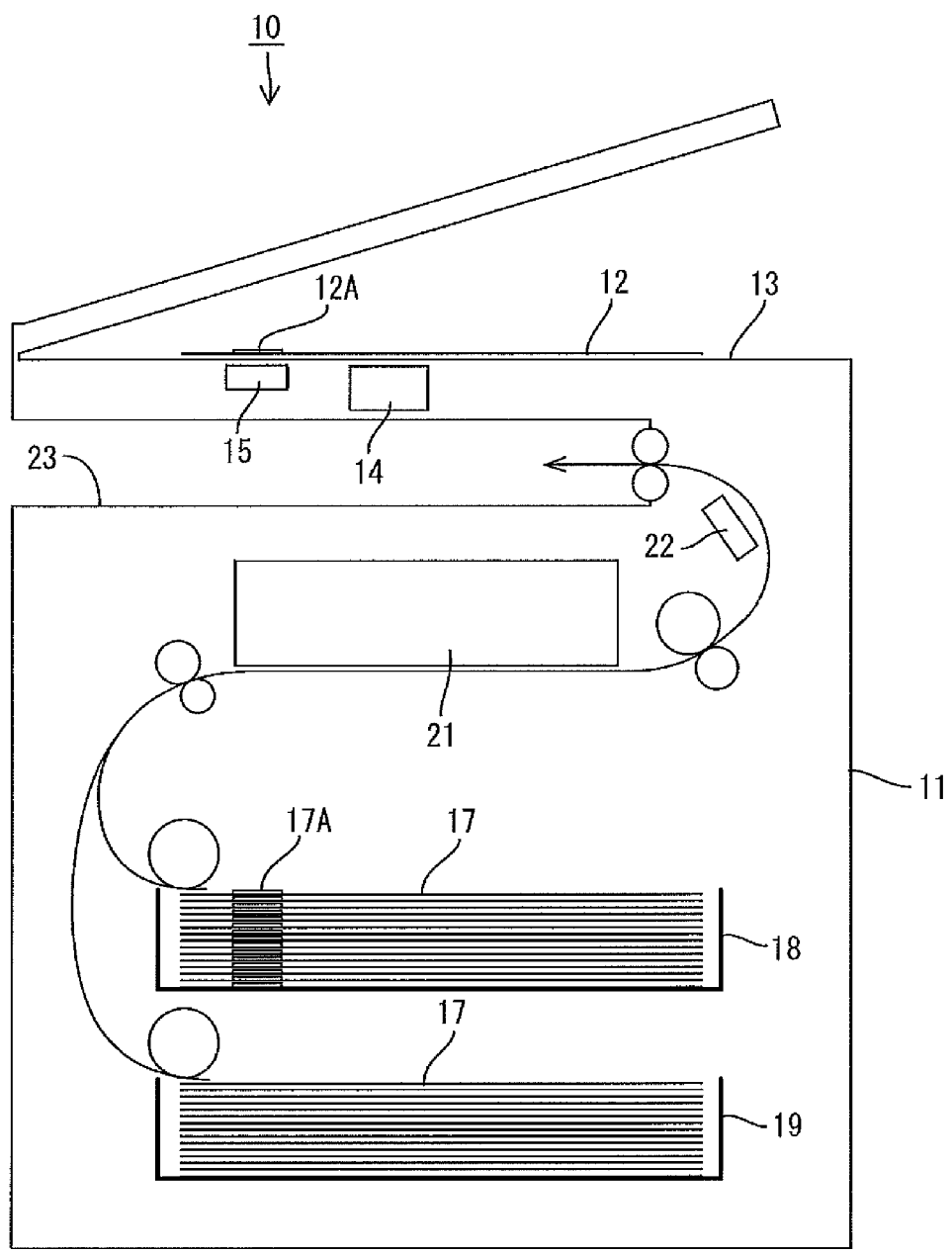
FIG. 1 is a cross-sectional view showing a simplified overall structure of a printer serving as an example of the image-forming device according to a preferred embodiment of the present invention.

FIG. 1 is a cross-sectional view showing a simplified overall structure of a printer 10 serving as an example of the image-forming device according to the present invention.

As shown in FIG. 1, the printer 10 has a main body 11. The top of the main body 11 is configured of a document bed 13 on which an original document 12 can be placed. A reading unit 14 is provided beneath the document bed 13 for scanning and optically reading an image on the original document 12 resting on the document bed 13 and for outputting image data generated based on the scanned image. The original document 12 placed on the document bed 13 may or may not have an RFID tag 12A attached thereto. The printer 10 also includes an IC reader 15 disposed beneath the document bed 13 for communicating with the RFID tag 12A through radio waves when a RFID tag 12A is attached to the original document 12 in order to acquire data recorded in the RFID tag 12A.

The printer 10 also includes a first tray 18 and a second tray 19 for accommodating a plurality of sheets 17 of paper in a stacked state. In this example, the first tray 18 accommodates sheets 17 having RFID tags 17A, while the second tray 19 accommodates sheets 17 without RFID tags.

The printer 10 also includes a conveying mechanism 31 (FIG. 2) described later for conveying sheets 17 provided in the trays 18 and 19 one sheet at a time to an image-forming position of an image-forming unit 21 and then an access position of an IC reader/writer 22, and for subsequently discharging the sheets onto a discharge tray 23. The image-forming unit 21 forms an image on the sheet 17 using colorant (ink or toner) in one or a plurality of colors. When a RFID tag 17A is attached to the sheet 17, the IC reader/writer 22 communicates with the RFID tag 17A through radio waves in order to read data recorded in the RFID tag 17A, write data to the RFID tag 17A, or both read and write data.

<Electrical Structure of the Printer>

Figure 2:
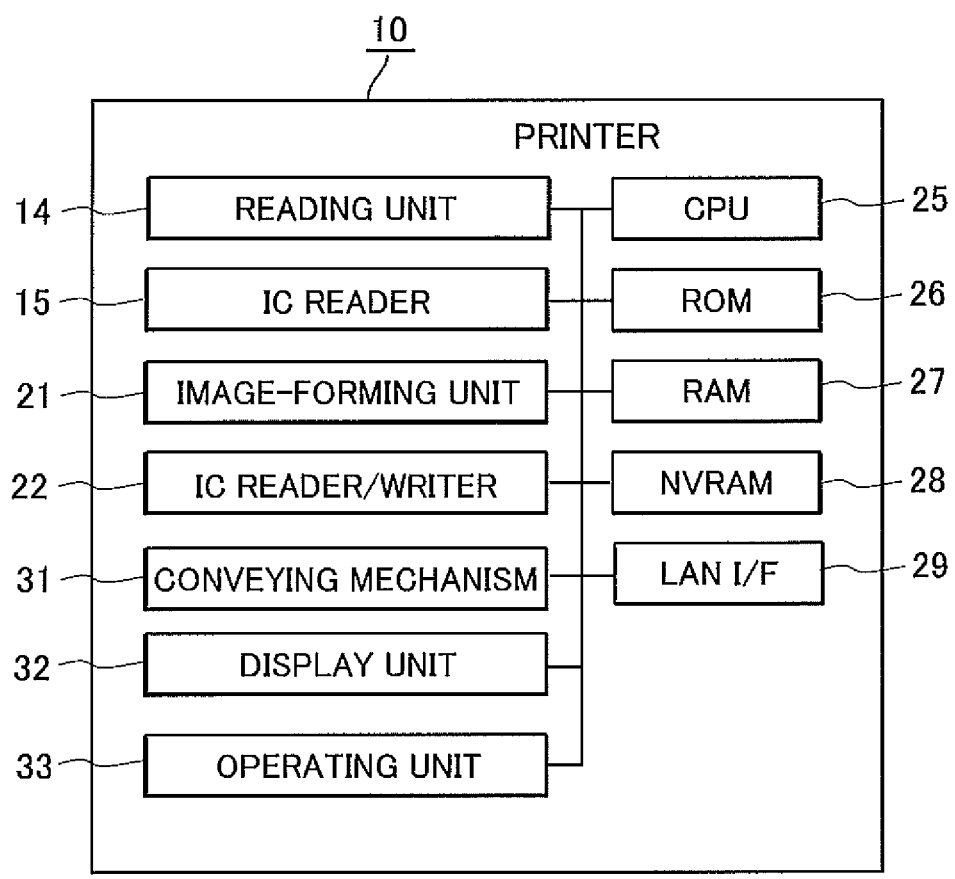
FIG. 2 is a block diagram showing a simplified electrical structure of the printer according to the preferred embodiment.

FIG. 2 is a block diagram showing a simplified electrical structure of the printer 10. As shown in FIG. 2, the printer 10 includes a CPU 25, a ROM 26, a RAM 27, a NVRAM (non-volatile memory) 28, and a network interface 29. These components are connected to the reading unit 14, IC reader 15, image-forming unit 21, and IC reader/writer 22 described above, as well as a conveying mechanism 31, a display unit 32, an operating unit 33, and the like.

The ROM 26 stores programs for executing various operations of the printer 10, such as a duplication control process described later. The CPU 25 reads programs from the ROM 26 and executes the programs to perform various control processes while storing the results of operations in the RAM 27 or the NVRAM 28. The network interface 29 connects the printer 10 to an external computer (not shown) or the like via a network line, enabling bi-directional data communications between the two devices.

The conveying mechanism 31 includes a plurality of rollers for conveying the sheets 17, a motor serving as a drive source for the rollers, and a gear mechanism for transmitting the driving force of the motor to the rollers. The display unit 32 includes a display for displaying configuration screens, the status of device operations, and the like; and indicator lamps.

<Duplication Control Process>

FIGS. 3 through 6 are flowcharts illustrating steps in a duplication control process. FIGS. 7 and 8 show configuration screens displayed on the display unit 32. FIG. 9 shows an error display screen.

The duplication control process is performed to create a duplicate of the original document 12 in any of various formats. The CPU 25 executes the duplication control process upon receiving a command inputted by the user on the operating unit 33. In S101 at the beginning of the duplication control process shown in FIG. 3, the CPU 25 initializes various counters (D, R, G, DE, RE, and GE) described later to "0". In S102 the CPU 25 executes a copy number setting process.

Figure 5:
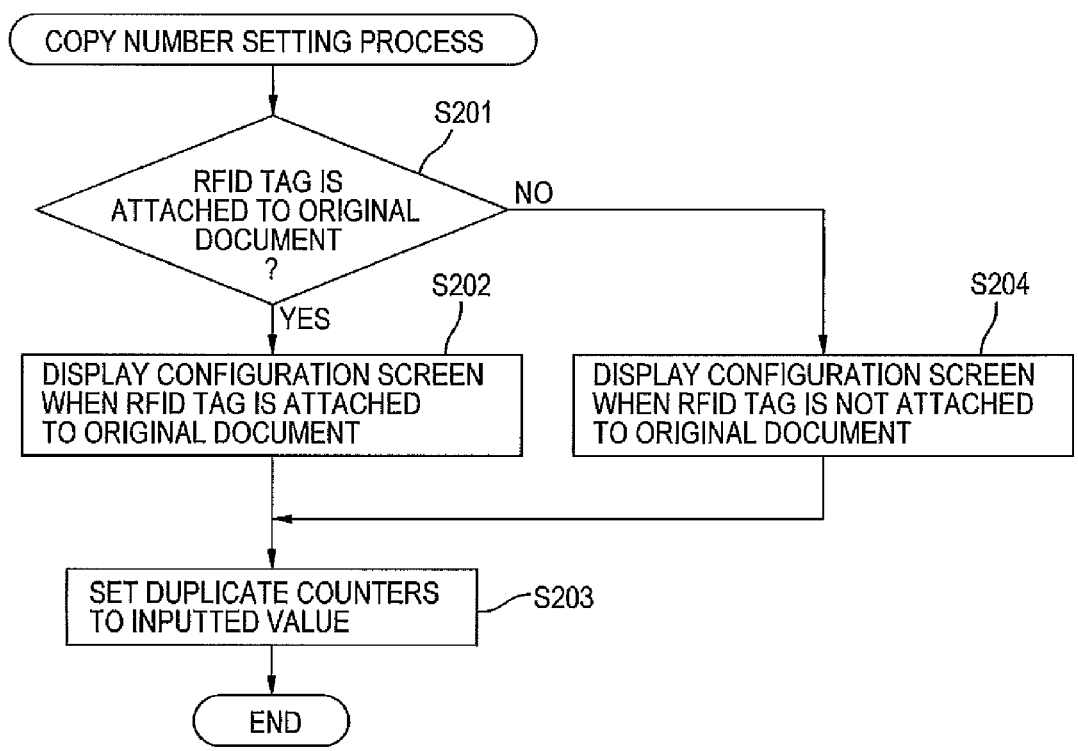
FIG. 5 is a flowchart illustrating steps in a copy number setting process.

As shown in FIG. 5, in S201 at the beginning of the copy number setting process, the CPU 25 determines whether a RFID tag 12A is attached to the original document 12 set on the document bed 13. In this step, the CPU 25 controls the IC reader 15 to emit a detection signal and detects the existence of the RFID tag 12A based on whether a response is received from the RFID tag 12A within a prescribed time.

If the CPU 25 detects a RFD tag 12A attached to the original document 12 (S201: YES), in S202 the CPU 25 displays a configuration screen M1 shown in FIG. 7 on the display unit 32. Through the configuration screen M1, the user can perform input on the operating unit 33 to specify the number of copies to be created in a image/RFID duplication process for duplicating both the image read from the original document 12 and data read from the RFID tag 12A (number of image/RFID duplicates), the number of copies to be created in a data duplication process for duplicating only data read from the RFID tag 12A (number of data duplicates), and the number of copies to be created in an image duplication process for duplicating only the image scanned from the original document 12 (number of image duplicates).

The CPU 25 totals the number of image/RFID duplicates, the number of data duplicates, and the number of image duplicates and displays this total in the configuration screen M1 as the total number of duplicates. The user can also specify the total number of duplicates in the configuration screen M1 through input on the operating unit 33. In this case, after the user inputs a total number of duplicates, the CPU 25 adjusts the number of image/RFID duplicates so that the total number of image/RFID duplicates, data duplicates, and image duplicates matches the inputted value for the total number of duplicates and displays this number of image/RFID duplicates in the configuration screen M1.

After the user indicates that the settings are complete (presses the OK button), in S203 the CPU 25 sets a image/RFID duplicate counter D, a data duplicate counter R, and an image duplicate counter G to the corresponding numbers of image/RFID duplicates, data duplicates, and image duplicates set in the configuration screen M1, and subsequently returns to S103 of FIG. 3.

When the CPU 25 detects that a RFID tag 12A is not attached to the original document 12 (S201: NO), in S204 the CPU 25 displays a configuration screen M2 shown in FIG. 8 on the display unit 32. The configuration screen M2 is identical to the configuration screen M1 described above, except the sections displaying the number of image/RFID duplicates and the number of data duplicates have been grayed out (disabled). Hence, the CPU 25 does not accept user input through the operating unit 33 for the number of image/RFID duplicates and the number of data duplicates in the configuration screen M2. Accordingly, the user can specify only the number of image duplicates. After the user indicates that settings are complete, in S203 the CPU 25 sets the image duplicate counter G to the number of image duplicates and sets the image/RFID duplicate counter D and the data duplicate counter R both to "0". Subsequently, the CPU 25 returns to S103 of FIG. 3.

Figure 3:
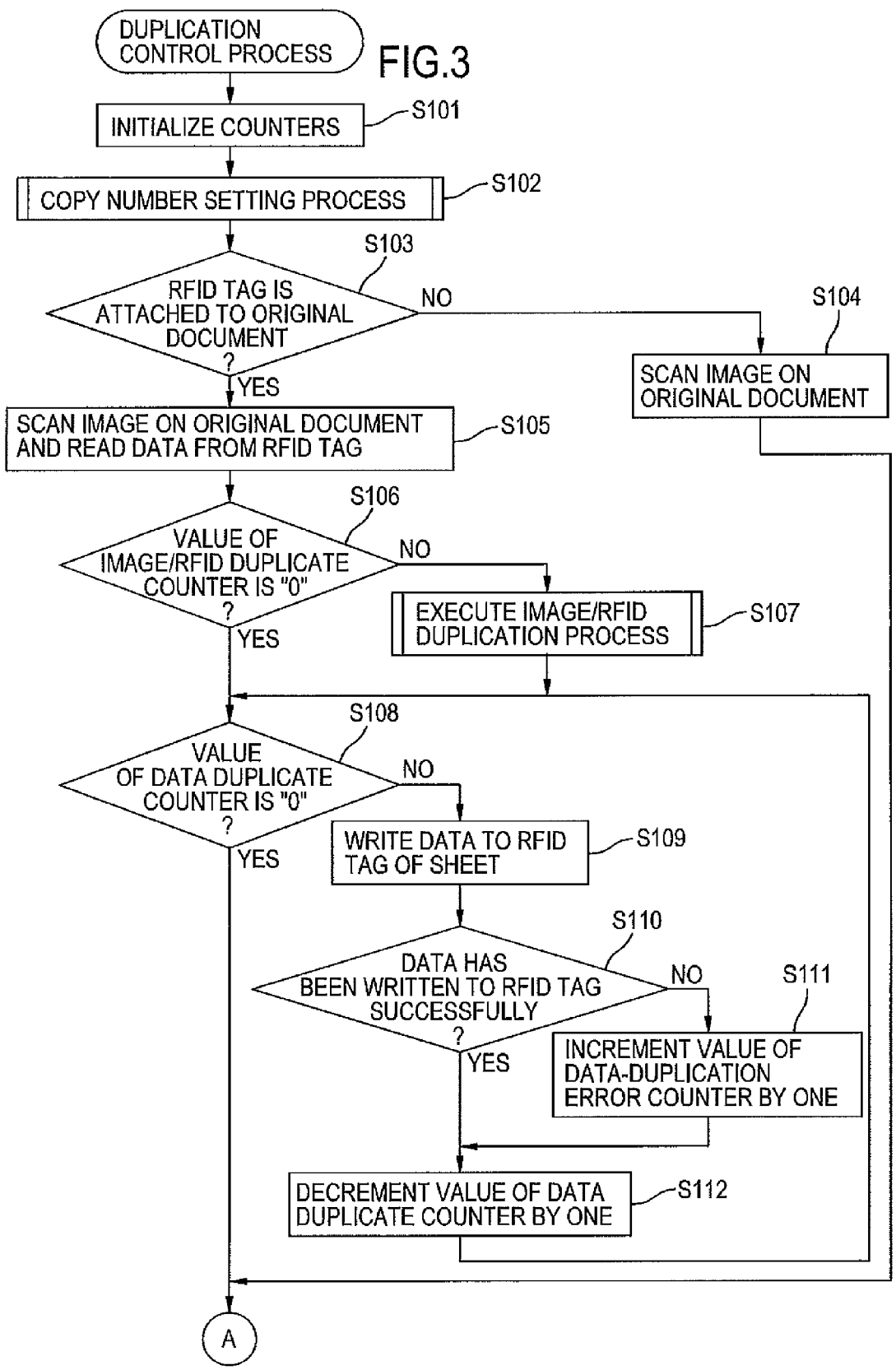
FIGS. 3 and 4 are flowcharts illustrating steps in a duplication control process.

After completing the copy number setting process in S102 of FIG. 3, in S103 the CPU 25 determines whether a RFID tag 12A is attached to the original document 12. When a RFID tag 12A is not attached to the original document 12 (S103: NO), in S104 the CPU 25 controls the reading unit 14 to scan the image on the original document 12. However, if a RFID tag 12A is attached to the original document 12 (S103: YES), in S105 the CPU 25 controls the reading unit 14 to scan the image on the original document 12 and further controls the IC reader 15 to read data from the RFID tag 12A. After reading the image on the original document 12 and the data in the RFID tag 12A, in S106 the CPU 25 determines whether the value of the image/RFID duplicate counter D is "0". When the value of the image/RFID duplicate counter D is not "0" (S106: NO), in S107 the CPU 25 executes an image/RFID duplication process described next.

Figure 6:
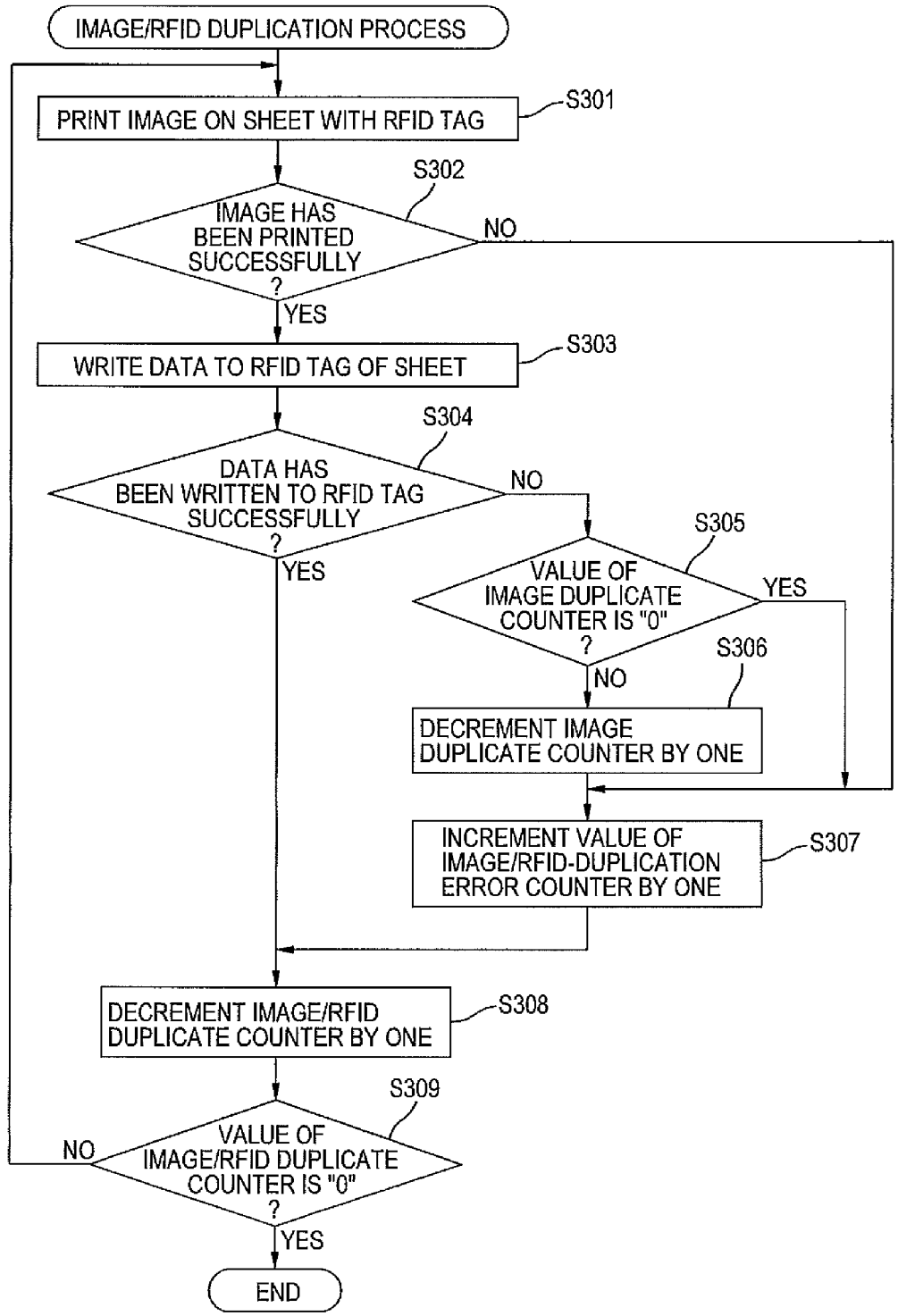
FIG. 6 is a flowchart illustrating steps in an image/RFID duplication process.

In S301 of the image/RFID duplication process shown in FIG. 6, the CPU 25 controls the conveying mechanism 31 to supply a sheet 17 with a RFID tag 17A loaded in the first tray 18 to the image-forming position, and controls the image-forming unit 21 to print an image on the sheet 17 based on the image data read by the reading unit 14. In S302 the CPU 25 determines whether the image was printed successfully. When the image has been printed successfully (S302: YES), in S303 the CPU 25 controls the IC reader/writer 22 to write the data that the IC reader 15 read from the original document 12 to the RFID tag 17A of the sheet 17.

In S304 the CPU 25 determines whether the data was written to the RFID tag 17A of the sheet 17 successfully. If the writing was not successful (S304: NO), in S305 the CPU 25 determines whether the value of the image duplicate counter G is "0". When the value of the image duplicate counter G is not "0" (S305: NO), in S306 the CPU 25 decrements the image duplicate counter G by one, thereby counting this sheet 17 with a RFID tag 17A as an image-only duplicate created in the image duplication process because the image was printed successfully but data could not be written properly to the RFID tag 17A. Then, in S307 the CPU 25 increments the value of a counter DE by one, where the counter DE indicates the number of copies created in the image/RFID duplication process for which an error occurred. Further, if the image was not printed successfully in S302 (S302: NO) or if the value of the image duplicate counter G is "0" (S305: YES), in S307 the CPU 25 also increments the value of the counter DE by one.

When data was properly written to the RFID tag 17A of the sheet 17 in S304 (S304: YES) or after the CPU 25 increments the counter DE by one in S307, in S308 the CPU 25 decrements the image/RFID duplicate counter D by one. In S309 the CPU 25 determines whether the value of the image/RFID duplicate counter D is "0". If the value of the image/RFID duplicate counter D is not "0" (S309: NO), the CPU 25 returns to S301 and repeats the process described above for a sheet 17 with a RFID tag 17A. However, if the value of the image/RFID duplicate counter D is "0" (S309: YES), indicating that the image/RFID duplication process has been performed for a number of sheets 17 equivalent to the number of image/RFID duplicates specified in the copy number setting process described earlier, the CPU 25 ends the image/RFID duplication process and returns to S108 of FIG. 3.

After completing the image/RED duplication process in S107 of FIG. 3 or when determining that the value of the image/RFID duplicate counter D is "0" in S106 (S106: YES), in S108 the CPU 25 determines whether the value of the data duplicate counter R is "0". If the value of the data duplicate counter R is not "0" (S108: NO), the CPU 25 repeatedly performs the data duplication process in S109-S112 described next until the value of the data duplicate counter R is "0".

Specifically, in S109 the CPU 25 controls the conveying mechanism 31 to convey a sheet 17 with a RFID tag 17A from the first tray 18 and controls the IC reader/writer 22 to write the data read from the RFID tag 12A of the original document 12 to the RFID tag 17A. In S110 the CPU 25 determines whether the data was written successfully. If writing was not successful (S110: NO), in S111 the CPU 25 increments the value of a counter RE by one, where the counter RE denotes the number of copies created during the data duplication process for which an error occurred. However, if the writing was successful (S110: YES) or after the counter RE was incremented by one in S111, in S112 the CPU 25 decrements the value of the data duplicate counter R by one and returns to S108. Thus, the CPU 25 performs the data duplication process in S109-S112 on a number of sheets 17 equivalent to the number of data duplicates set in the copy number setting process described earlier.

When the CPU 25 determines in S108 that the value of the data duplicate counter R is "0" (S108: YES) or after scanning the image from the original document 12 in S104, in S113 (see FIG. 4) the CPU 25 determines whether the value of the image duplicate counter G is "0". If the value of the image duplicate counter G is not "0" (S113: NO), the CPU 25 repeats the image duplication process in S114-S117 described next until the value of the image duplicate counter G is "0".

Specifically, in S114 the CPU 25 controls the conveying mechanism 31 to convey a sheet 17 without a RFID tag 17A from the second tray 19 to the image-forming position and controls the image-forming unit 21 to print the image scanned from the original document 12 on the sheet 17. In S115 the CPU 25 determines whether the image was printed successfully. If printing was not successful (S115: NO), in S116 the CPU 25 increments a counter GE by one, where the counter GE indicates the number of copies generated in the image duplication process for which an error occurred. However, if printing was successful (S115: YES) or after the CPU 25 increments the counter GE by one in S116, in S117 the CPU 25 decrements the image duplicate counter G by one and subsequently returns to S113. Thus, the CPU 25 performs the image duplication process in S114-S117 described above on a number of sheets 17 equivalent to the value obtained by subtracting the number of image-only duplicates created in the image/RFID duplication process from the number of image duplicates specified in the copy number setting process described earlier.

When the CPU 25 determines in S113 that the value of the image duplicate counter G is "0" (S113: YES), in S118 the CPU 25 determines whether an error occurred in any of the duplication processes described above, i.e., whether any of the counters DE, RE, and GE specifying the number of copies for which an error occurred in the respective processes is not "0". If an error occurred in any of the duplication processes (S118: YES), in S119 the CPU 25 displays error data on the display unit 32 to notify the user of the error status. Here, the error data displayed on the display unit 32 may include the number of copies in which errors occurred in the corresponding duplication processes (the values of the counters D, E, RE, and GE) associated with the corresponding image/RFID duplication, data duplication, and image duplication processes. Alternatively, the displayed error data may associate the format of each duplication process with the number of duplicates successfully created in each duplication process. FIG. 9 shows an example of error data displayed in an error display screen M3. In the error display screen M3, the number of successfully created duplicates and the number of failures is displayed for each of the three duplication formats. By viewing the error display screen M3, the user can easily discern the number of copies that were not created for each duplication format in relation to the settings made in the copy number setting process.

This ends the duplication control process. Through this process, the CPU 25 creates duplicates for the image/RFID duplication, data duplication, and image duplication formats according to the numbers specified in the copy number setting process, excluding the number of copies in which an error occurred.

<Effects of the Embodiment>

According to the preferred embodiment described above, the printer 10 can execute an image/RFID duplication process for duplicating both RFID data and images read from an original document 12 having a RFID tag 12A and a data duplication process for duplicating only RFD data based on the user's instructions. Hence, the printer 10 according to the preferred embodiment is more user-friendly since the user not only can create duplicates of both RFID data and images recorded on an original document 12 with a RFID tag 12A, but also can create duplicates of only RFID data.

In addition to the image/RFID duplication process and data duplication process of the preferred embodiment described above, the printer 10 can perform an image duplication process for duplicating only the image on the original document 12, thereby increasing the number of duplication formats that are possible on the printer 10 and, thus, improving user-friendliness.

Further, the printer 10 of the preferred embodiment executes each duplication process a number of times equivalent to the number of copies set in the copy number setting process for each duplication format. Accordingly, the user can obtain a desired number of duplicates for the desired duplication formats, thereby enhancing user-friendliness.

Further, in the image/RFID duplication process of the preferred embodiment, the printer 10 counts sheets 17 on which an image was formed but for which writing of RFID data was unsuccessful as an image-only duplication so that successfully printed sheets 17 can be used rather than wasted.

Further, when the original document 12 set on the document bed 13 does not have an attached RFID tag 12A, the input sections on the screen for the number of image/RFID duplicates and the number of data duplicates are disabled in the copy number setting process, thereby preventing the printer 10 from executing an unintended duplication process due to the user incorrectly inputting specifications or selecting an incorrect original document.

Further, the image/RFID duplication process and data duplication process use sheets 17 with RFID tags 17A loaded in the first tray 18, while the image duplication process uses sheets 17 without RFID tags 17A loaded in the second tray 19. This method reduces paper costs by using the less expensive sheets 17 without RFID tags 17A in image-only duplication.

Further, when an error occurs in any of the duplication processes, the printer 10 of the preferred embodiment notifies the user of these errors by displaying at least one of the number of successful duplicates and the number of failed duplicates in association with each type of duplication process. In this way, the user can easily discern the number of duplicates that are lacking for each duplication format and can promptly take suitable steps to compensate for these errors (reprinting a number of duplicates to compensate for the number of failures, for example).

<Variations of the Embodiment>

While the invention has been described in detail with reference to specific embodiments thereof, it would be apparent to those skilled in the art that many modifications and variations may be made therein without departing from the spirit of the invention, the scope of which is defined by the attached claims.

(1) The present invention can be applied to image-forming devices with a variety of image-forming methods, such as an electrophotographic image-forming device and an inkjet image-forming device.

(2) While the example of the preferred embodiment describes the printer reading only one sheet of an original document set on the document bed by the user a single time, the image-forming device of the present invention may employ an automatic document feeder (ADF), for example, to sequentially convey a plurality of sheets of an original document set in the feeder to the scanning position. Using the ADF, the image-forming device may scan an image and read RFID data from each sheet and may create a duplicate of each sheet in any of the various formats described in the preferred embodiment.

(3) When duplicating images of an original document, the image-forming device of the present invention may form an image by partially modifying the image scanned from the original (for example, by omitting a portion of the original image or adding a separate image to the original image). Further, when duplicating data acquired from the storage unit of the original document, the image-forming device of the present invention may write data to the duplicate that is partially modified from the original (for example, by deleting a portion of the original data or adding separate data to the original data).

(4) While the user inputs various instructions (specifying duplication formats and the number of duplications for each format, for example) on an operating unit of the printer in the preferred embodiment described above, the user may perform such input on an external computer or the like connected to the printer, and the inputted instructions may be transmitted to the printer via the network interface.

(5) In the preferred embodiment described above, the printer notifies the user only of the number of duplicate failures caused by an error for each duplication process. However, the image-forming device of the present invention may also indicate the page numbers of the discharged sheets of paper for which errors occurred during each duplication process when notifying the user of errors, by displaying data indicating that duplication failed for the corresponding sheets of paper in the corresponding duplication processes. Further, if a failure occurs when creating a duplicate, the image-forming device may attempt to recreate the duplicate using a separate sheet of paper so that the number of successfully created duplicates matches the number of copies specified in the copy number setting process.

(6) In the preferred embodiment described above, the tray that accommodates sheets with RFID tags and the tray that accommodates sheets without RFID tags have been predetermined. However, the user may be allowed to indicate which of the plurality of trays holds sheets with RFID tags through input operations on the operating unit of the printer. Alternatively, IC readers may be provided for detecting RFID tags in the sheets loaded in the trays. In this case, the sheets are supplied from the tray accommodating sheets determined to have RFID tags based on the detection results by the IC reader when it is necessary to write RFID data to an RFID tag.

(7) In the preferred embodiment described above, an IC reader/writer is used as a means for writing RFID data. However, the writing means of the present invention need not be provided with a function for reading data from a storage unit of a recording medium, provided that the writing means has a function for writing data to the storage unit. Further, an IC reader or other reading device may be provided separately from the writing means for reading data from the storage unit of a recording medium to determine whether data was properly written thereto.

Figure 4:
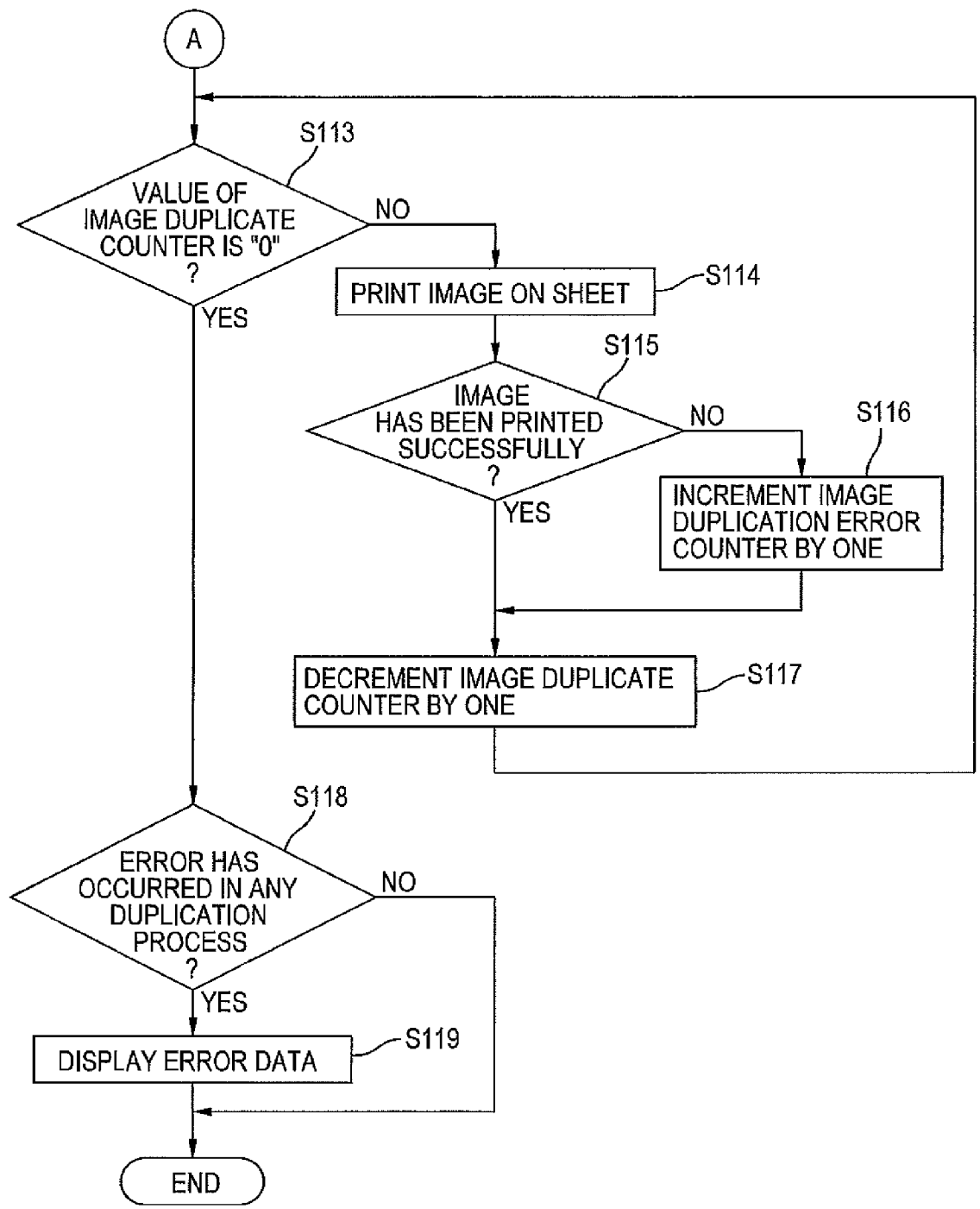

(8) In the preferred embodiment described above, the image/RFID duplication process, the data duplication process, and the image duplication process are performed. However, if at least the image/RFID duplication process and the data duplication process are performed, it is possible to improve the user-friendliness for creating duplicates of original documents having storage units. In such case, the processes S113-S117 in FIG. 4 are skipped.

(9) In the preferred embodiment described above, if an error occurred in any of the duplication processes (S118: YES), in S119 the CPU 25 displays error data on the display unit 32 to notify the user of the error status. However, the method of notifying is not limited to the displaying. For example, the user of the error status may be notified by an audio.

What is claimed is:

1. An image-forming device comprising:
    an image-reading unit configured to read an image formed on an original document;
    a data-reading unit configured to read, if the original document has a storing member, the data stored in the storing member;
    a duplication-performing unit configured to perform a plurality of duplication processes including at least;
        an image/data-duplication process in which the duplication-performing unit forms the read image read by the image-reading unit on a first recording medium having a storing member and writes the read data read by the data-reading unit to the storing member of the first recording medium; and
        an image-duplication process in which the duplication-performing unit forms the read image read by the image-reading unit on one of the first recording medium without writing the read data read by the data-reading unit to the storing member of the first recording medium and a second recording medium not having a storing member;

a receiving unit configured to receive an image/data-duplication instruction and an image-duplication instruction, the image/data-duplication instruction being configured to indicate a number of times for which the image/data duplication process should be performed, and the image-duplication instruction being configured to indicate a number of times for which the image-duplication process should be performed;

a controlling unit configured to control the duplication-performing unit to perform the image/data-duplication process if the receiving unit receives the image/data-duplication instruction and configured to control the duplication-performing unit to perform the image-duplication process if the receiving unit receives the image-duplication instruction a counter configured to count each time the image-duplication process has been performed; and a detecting unit configured to detect that the duplication-performing unit has failed to write the read data read by the data-reading unit to the storing member of the first recording medium in the image/data-duplication process, wherein the counter is further configured to count when the detecting unit detects that the duplication performing unit has failed to write the read data read by the data-reading unit to the storing member of the first recording medium in the image/data-duplication process.

2. The image-forming device according to claim 1, wherein the plurality of duplication processes further includes a data-duplication process in which the duplication-performing unit writes the read data read by the data-reading unit to the storing member of the first recording medium without forming the read image read by the image-reading unit on the first recording medium, and wherein the receiving unit is further configured to receive a data-duplication instruction configured to indicate a number of times for which the data-duplication should be performed.

3. The image-forming device according to claim 1, further comprising a determining unit configured to determine whether or not the original document has the storing member, wherein if the determining unit determines that the original document has not the storing member, the receiving unit fails to receive the image/data-duplication instruction.

4. The image-forming device according to claim 1, further comprising:

a first accommodating unit configured to accommodate the first recording medium; and a second accommodating unit configured to accommodate the second recording medium, wherein the duplication-performing unit is configured to performing the image/data-duplication process for the first recording medium accommodated in the first accommodating unit, and is configured to perform the image-duplication process for the second recording medium accommodated in the second accommodating unit.

5. The image-forming device according to claim 1, further comprising:

an error-detecting unit configured to detect that the duplication-performing unit has failed to perform each duplication process; and an error-notifying unit configured to notify, for each duplication process, at least one of a number of a recording medium for which the duplication-performing unit has performed the duplication process and a number of a recording medium for which the duplication-performing unit has failed to perform the duplication process, when the error-detecting unit detects that the duplication-performing unit fails to perform each of the duplication process.

6. An image processing method comprising:

reading, by an image-reading unit, an image formed on an original document;

reading, by a data-reading unit, data stored in a storing member if the original document has the storing member;

performing, when an image/data-duplication instruction is received, an image/data-duplication process in which the read image read by the image-reading unit is formed on a first recording medium having a storing member and the read data read by the data-reading unit is written to the storing member of the first recording medium, the image/data-duplication instruction being configured to indicate a number of times for which the image/data-duplication process should be performed;

performing, when an image-duplication instruction is received, an image-duplication process in which the read image read by the image-reading unit is formed on one of the first recording medium without writing the read data read by the data-reading unit to the storing member of the first recording medium and a second record medium not having a storing member, the image-duplication instruction being configured to indicate a number of times for which the image-duplication process should be performed;

detecting that writing the read data read by the data-reading unit to the storing member of the first recording medium has failed in the image/data-duplication process; and counting, with a counter, each time the image-duplication process has been performed and further counting when it is detected that the writing of the read data read by the data-reading unit to the storing member of the first recording medium has failed in the image/data-duplication process.

7. A non-transitory storage medium storing a program executable on an image processing apparatus, the program including a set of program instructions comprising:

reading, by an image-reading unit, an image formed on an original document;

reading, by a data-reading unit, data stored in a storing member if the original document has the storing member;

performing, when an image/data-duplication instruction is received, an image/data-duplication process in which the read image read by the image-reading unit is formed on a first recording medium having a storing member and the read data read by the data-reading unit is written to the storing member of the first recording medium, the image/data-duplication instruction being configured to indicate a number of times for which the image/data-duplication process should be performed;

performing, when an image-duplication instruction is received, an image-duplication process in which the read image read by the image-reading unit is formed on one of the first recording medium without writing the read data read by the data-reading unit to the storing member of the first recording medium and a second record medium not having a storing member, the image-duplication instruction being configured to indicate a number of times for which the image-duplication process should be performed;

detecting that writing the read data read by the data-reading unit to the storing member of the first recording medium has failed in the image/data-duplication process; and counting, with a counter, each time the image-duplication process has been performed and further counting when it is detected that the writing of the read data read by the data-reading unit to the storing member of the first recording medium has failed in the image/data-duplication process.

8. The image-forming device according to claim 2, further comprising a determining unit configured to determine whether or not the original document has the storing member; displaying unit configured to display a selection screen, wherein when the determining unit determines that the original document does not have a storing member, the selection screen is displayed with a selection of the image/data-duplication process and the data-duplication process being disabled.

9. The image-forming device according to claim 2, further comprising a displaying unit configured to display a selection screen, the selection screen configured to receive a total number of times of for a sum of the image/data-duplication process, the image-duplication process and the data-duplication process, and a number of times for each of the image/data-duplication process, the image-duplication process and the data-duplication process;

a determining unit configured to determine if the received total number of times is less a sum of the received number of times for each of the image/data-duplication process, the image-duplication process and the data-duplication process, wherein when the determining unit determines that the received total number of times is less than the sum of the received number of times for each of the image/data-duplication process, the image-duplication process and the data-duplication process, the received number of times for the image/data-duplication process is adjusted.

* * * * *